Dec. 20, 1966 E. E. NEWHALL 3,293,621

MAGNETIC CORE BINARY COUNTER

Filed Nov. 30, 1962 2 Sheets-Sheet 1

INVENTOR
E. E. NEWHALL
BY Lucian C. Canepa
ATTORNEY

Dec. 20, 1966 E. E. NEWHALL 3,293,621

MAGNETIC CORE BINARY COUNTER

Filed Nov. 30, 1962 2 Sheets-Sheet 2

3,293,621
MAGNETIC CORE BINARY COUNTER

Edmunde E. Newhall, Brookside, N.J., assignor to Bell Telephone Laboratories, Incorporated, New York, N.Y., a corporation of New York Filed Nov. 30, 1962, Ser. No. 241,261
14 Claims. (Cl. 340—174)

This invention relates to a magnetic core circuit and, more specifically, to a multiapertured magnetic core arrangement which functions as a binary counter.

Electronic counting circuits which register the number of binary input pulses supplied thereto by a pulse source are well known. One extensively employed counting arrangement includes a plurality of set-reset flip flop circuits in one-to-one correspondence with the number of digits included in the highest number to be registered in the counter. Logic generating elements are connected to both the set and reset terminals of each flip flop. Input signals, indicative of both the previous state of the counter and also the value of the input information digit, are supplied to the logic elements of each stage through delaying devices. In response to an input binary "1" being supplied to the counter, selected ones of the bistable flip flop arrangements change their operating conditions thereby increasing the registered count by one unit, while the flip flop circuits remain in their previous condition in response to a supplied binary input "0".

It is significant to note, however, that the above-described binary counter as well as other prior art counters requires at least one bistable arrangement, a logic generating element, and usually also a plurality of delaying devices for each stage of counting capacity. Therefore, the number of circuit elements increases virtually in direct proportion to counter capacity, with a multistage counter thereby employing a relatively large number of components.

It is therefore an object of the present invention to provide an improved magnetic binary counting arrangement.

More specifically, an object of the present invention is the provision of an improved magnetic core binary counter which advances through a series of unique counting conditions in response to a plurality of input pulses being supplied thereto.

Another object of the present invention is the provision of a highly reliable magnetic core binary counter which advantageously may be inexpensively and easily constructed, and is capable of a relatively high operational repetition rate.

These and other objects of the present invention are realized in a specific, illustrative, magnetic core binary counter which includes six ferromagnetic, multiapertured cores. Each core includes two driving legs, each shunted by a magnetic member of a like cross-sectional area. Two cross legs are provided to complete a magnetic path which also includes the driving legs. Each cross leg member has a uniform cross-sectional area which is twice the magnitude of that possessed by each of the driving and shunt legs and, corresponding to an $n$-stage binary counter, $n$ magnetic circuits each including four equal-length parallel magnetic paths are included in the cross legs of the first one of the cores. The cross legs contained in each of the remaining cores include $2n$ apertures centrally located along the long axes thereof.

Each counter stage comprises one of the magnetic circuits included in the first core which has coupled thereto two input windings and two output windings which are employed to respectively generate Exclusive OR or sum logic, and the AND or carry binary logic function. In addition, two delay elements are provided, each including three short-circuited windings coupled to apertures included in the remaining five cores. One delay element is employed to supply the sum signal back to one input winding linked to the magnetic circuit, and the remaining delay element transmits the carry signal to an input winding included in the next succeeding counter stage. Binary input information is supplied to an input winding coupled to the first counter stage, and is manifested by the presence of an input current flowing in one of the two possible directions.

Logic is generated, and counting information is advanced in the counter in response to pulses supplied by a three-phase clock source which selectively switches and resets each of the six multiapertured cores between a saturated and a neutral magnetic condition.

It is thus a feature of the present invention that a magnetic core binary counter include a fixed number of cores independent of the number of digits in the highest number to be counted and registered therein.

It is another feature of the present invention that a magnetic core binary counter include a plurality of multiapertured, square loop, ferromagnetic cores, each including a cross leg and a driving leg which completes a closed magnetic path that includes the cross leg; one of the cores include a plurality of magnetic circuits each comprising four equal-length, parallel-connected members in the cross leg thereof; the remainder of the cores have cross legs including a plurality of apertures centrally located thereon; and that the counter further include a plurality of short-circuited coupling windings which are linked to selected apertures included in the plurality of cores, each of the coupling windings being linked to the ferromagnetic material on each side of the corresponding core aperture in an opposite polarity, selected ones of the coupling windings being linked to each member included in one of the magnetic circuits.

A complete understanding of the present invention and of the above and other features, advantages and variations thereof may be gained from a consideration of the following detailed description of an illustrative embodiment thereof presented hereinbelow in conjunction with the accompanying drawing, in which.

Figure 1:
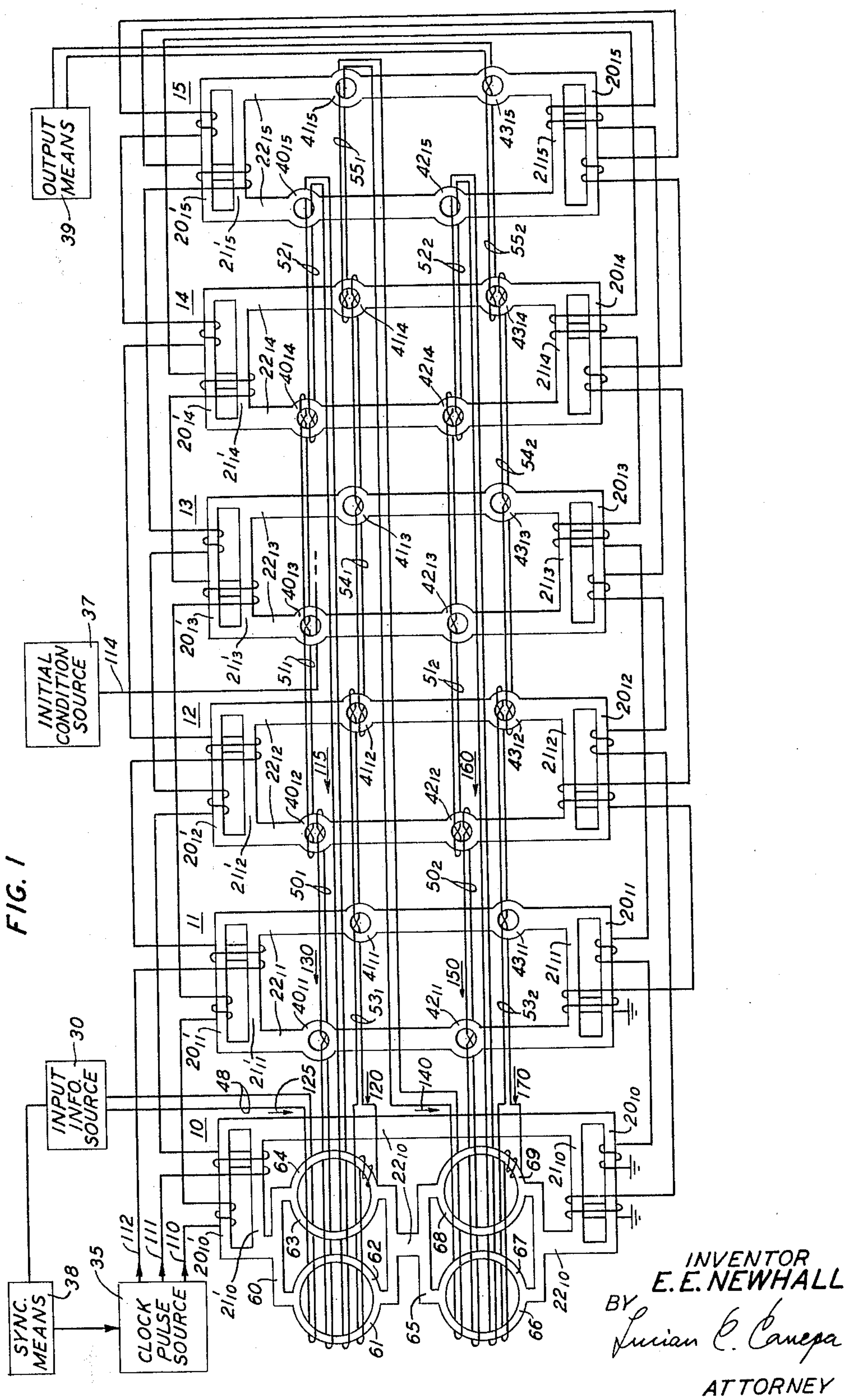
FIG. 1 is a diagram of a specific, illustrative, multiapertured magnetic core binary counter which embodies the principles of the present invention.

Referring now to FIG. 1, there is shown a specific, illustrative, magnetic core, two-stage, binary counter which includes six multiapertured, square loop, ferromagnetic cores 10 through 15. Each core includes two driving legs 20 and 20', each connected in parallel with a shunt leg 21 and 21', respectively. Two cross legs 22 are provided, each connecting a junction of the driving leg 20 and the shunt leg 21 with the corresponding junction of the legs 20' and 21'. Each of the cross legs 22 has a uniform cross-sectional area which is twice the magnitude of that possessed by each of the driving legs 20 and 20' and the shunt legs 21 and 21', all of the aforementioned magnetic legs having a like value of maximum remanence. Hence, each of the cross legs 22 has twice the flux-carrying capacity of either of the driving legs 20 and 20' or the shunt legs 21 and 21'.

A plurality of apertures 40 through 43 are centrally located on the long axes of the cross legs 22 included in each of the cores 11 through 15. The apertures 40 and 41 included in each of the cores 11 through 15 are associated with the first counter stage and the apertures 42 and 43 are included in the second counter stage. Two magnetic circuits 60 and 65, each including four equal-length, parallel-connected, magnetic members 61 through 64, and 66 through 69, respectively, are included in the left-hand cross leg 22 of the core 10. The magnetic circuits 60 and 65 are respectively associated with the first and second counting stages.

A plurality of short-circuited coupling windings $50_1$ through $55_1$, and $50_2$ through $55_2$ are provided. It is noted at this point that the subscripts 1 and 2 employed above are used to designate the particular one of the two binary counter stages included in the FIG. 1 arrangement which includes the corresponding element. It is also noted that each one of a pluraltiy of additional circuit elements identified above is further designated by one of the subscripts 10 through 15 indicating the particular core of the plurality of cores 10 through 15 with which it is associated. Hence, for example, the leg $21_{15}$ corresponds to the shunt leg 21 which is included in the multiapertured core 15, and the winding $51_2$ corresponds to the coupling winding 51 employed in the second counting stage.

Each stage of the binary counter comprises one of the magnetic circuits 60 and 65 included in core 10, then core apertures including two from each of the cores 11 through 15, and six short-circuited coupling windings. The first stage comprises the magnetic circuit 60 which includes the members 61 through 64, the apertures $40_{11}$ through $40_{15}$ and $41_{11}$ through $41_{15}$, and the short-circuited coupling windings $50_1$ through $55_1$. Similarly, the magnetic circuit 65 including the magnetic members 66 through 69, the core apertures $42_{11}$ through $42_{15}$ and $43_{11}$ through $43_{15}$, and the coupling windings $50_2$ through $55_2$ are included in the second counting stage.

Examining the first binary counter stage, the windings $50_1$, $52_1$ and $53_1$ are coupled to the magnetic members 61 through 64 included in the magnetic circuit 60, and also the core apertures $40_{11}$ and $40_{12}$, $40_{14}$ and $40_{15}$, and $41_{11}$ and $41_{12}$, respectively. The windings $51_1$ and $54_1$ are respectively coupled to the core apertures $40_{12}$, $40_{13}$ and $40_{14}$, and $41_{12}$, $41_{13}$ and $41_{14}$, while the final winding $55_1$ included in the first binary counter stage is coupled to the apertures $41_{14}$ and $41_{15}$ included in the first counter stage and also coupled to each of the magnetic members 66 through 69 included in the second counter stage. It is noted that whenever any of the short-circuited windings 50 through 55 are coupled to any of the apertures 40 through 43, they are in every case linked to the magnetic material on each side of the aperture in an opposite polarity. The coupling windings $50_2$ through $55_2$ associated with the second counting stage are connected in a manner identically paralleling that described above for the first counter stage, except that the winding $55_2$ passing through the final aperture $43_{15}$ included in the second and last counter stage is coupled to an output means 39. An input winding 48 is coupled to each of the members 61 through 64 included in the magnetic circuit 60 of the first counter stage. The polarity with which each of the windings is coupled to each of the members of the magnetic circuits 60 and 65 will be described hereinafter.

An input information source 30 is linked by the input winding 48 to the ferromagnetic members 61 through 64 included in the first counter stage. The source 30 supplies the input binary digits which are to be counted and registered in the FIG. 1 counting arrangement, with the binary input information being manifested by an input current flowing in a selected one of the two possible directions. Hereinafter, a current which flows in the input winding 48 in the direction of the vector 125 shown in FIG. 1 alongside the winding 48 will be regarded as an input binary "1," and an input "0" is represented by a current flowing in the opposite direction.

A clock source 35 is provided to sequentially supply current pulses to three switching and reset windings 110 through 112, with the source 35 supplying a pulse to only one of the windings 110 through 112 at any one time, and supplying pulses to each of the windings 110 through 112 in that order. The information source 30 is constrained by a synchronizing means 38 to supply an information digit only when the clock pulse source is supplying an energization pulse to the switching and reset winding 110. In addition, an initial condition source 37 is coupled by a winding 114 to each of the apertures 40 through 43 included in the cores 13 through 15. The winding 114 is shown coupled only to the aperture $40_{13}$ to clarify FIG. 1, but it is to be understood that the winding 114 is in fact coupled to all the above-identified apertures. As described hereinafter, the source 37 and the winding 114 are employed only once to set the cores 13 through 15 to the proper initial magnetic condition, and may be disregarded thereafter.

The winding 110 is coupled to the driving legs 20 and 20' included in the cores 10 and 11 to provide a counter-clockwise, or switching direction magnetomotive force throughout these cores, when a current pulse from the source 35 is supplied thereto. The winding 110 is also coupled to the driving legs 20 and 20', and the shunt legs 21 and 21', included in the cores 13 and 14 to provide a magnetomotive force to these cores in a clockwise, or reset direction. Similarly, the switching and reset winding 111 is coupled to the driving legs 20 and 20' and shunt legs 21 and 21' of the cores 10 and 15 in the clockwise, reset direction and is also coupled to the driving legs 20 and 20' of the cores 12 and 13 in the counter-clockwise switching direction. Finally, the switching and reset winding 112 is coupled to the cores 14 and 15 in the switching direction and to the cores 11 and 12 in the reset direction.

The basic circuit functioning of each of the two counting stages included in FIG. 1 may be demonstrated in general terms by referring to Table I included hereinbelow, which is in part a truth table for the necessary logic functioning to be accomplished in each counter stage.

TABLE I

| Information Input | Previous State Input | Next State, Or Sum Output | Carry Output | Selected Magnetic Circuit Member |
|---|---|---|---|---|
| 0 | 0 | 0 | 0 | 61 and 66 |
| 0 | 1 | 1 | 0 | 62 and 67 |
| 1 | 0 | 1 | 0 | 63 and 68 |
| 1 | 1 | 0 | 1 | 64 and 69 |

When the input information and the previous condition of a counting stage are both binary "0's," the sum and carry outputs most also be "0," as indicated in Table I. When either the input signal or the previous state, but not both, is a "1," the sum output is constrained to be a "1" and the carry output a "0." When both the binary input and the previous state are a "1," however, the sum output should be a "0" and the carry digit output a "1." Each binary counter stage made in accordance with the principles of the present invention will be shown to conform to the truth table set forth in Table I above.

In order to perform the logic described above, the input windings 48 and $52_1$ included in the first counter stage are respectively coupled to the magnetic members 63 and 64, and 62 and 64, in a first direction to supply thereto a downward magnetizing force when energized with currents in the directions of the arrows 125 and 115, which are shown in FIG. 1. The windings 48 and $52_1$ are coupled to the remaining members, viz., members 61 and 62, and 61 and 63, respectively, in a second and opposite polarity. The input winding 48 and the winding $52_1$ are respectively employed to supply to the first stage of the illustrative counter the information input and previous state input signal, while the windings $50_1$ and $53_1$ have induced therein the sum and carry output signals, respectively. The sum winding $50_1$ is coupled to the members 62 and 63 in the first direction and to the members 61 and 64 in the second direction. The carry output winding $53_1$ is coupled to each of the magnetic members 61, 62 and 63 in the second direction, and to the remaining member 64 in the first direction. The winding $53_1$ is coupled to the magnetic member 64 with three turns, while each of the other couplings to the magnetic circuit 60 has just one turn. This is to ensure a quiescent balancing of extraneous signals, as the winding $53_1$ is coupled to three magnetic members in one polarity and only one member in the other polarity. The corresponding windings associated with the second counter stage are coupled to the magnetic members 66 through 69 in an identical manner, with the winding $55_1$ being analogous to the first stage input winding 48.

Again referring to the first counter stage, the members 61 through 64, along with the apertures $40_{11}$ through $40_{15}$ and the windings $50_1$ through $52_1$, comprise one delaying element; and the members 61 through 64, the apertures $41_{11}$ through $41_{15}$ and the windings $53_1$ through $55_1$ comprise another delaying arrangement. That is, signals induced in the sum and carry output windings $50_1$ and $53_1$ in either polarity during the energization of the winding 110 will be supplied to the corresponding input windings $52_1$ and $55_1$ at a later time after the clock source 35 has sequentially energized each of the windings 111 and 112 and once again supplies a current pulse to the winding 110. The nature and functioning of this delaying arrangement is set forth in particular detail in my joint cofiled application with J. R. Perucca, Secial No. 241,339, filed November 30, 1962, which is in part directed thereto. Briefly, the windings 110 through 112 are provided to selectively drive the cross legs 22 included in the cores 10 through 15 between a saturated and a neutral magnetic condition. Information is stored and advanced in the ferromagnetic material surrounding the core apertures included in the cross legs 22 in response to switching currents supplied to the windings 110 through 112 by the three-phase clock source 35. When the winding 110 is energized, information is stored in the magnetic circuit 60 and also in the apertures $40_{11}$ and $41_{11}$ included in the core 11 coupled thereto. The information is stored in these core apertures by a net flux perturbation around these apertures in a clockwise or counter-clockwise direction in the case of a stored binary 1 or 0, respectively. When the winding 111 is energized, the cross legs 22 included in the cores 12 and 13 are switched to a neutral condition and the core 10 is reset to its saturated condition, with information moving from the core 10 to each of the cores 12 and 13. When the winding 112 is energized the cores 11 and 12 are reset and the cores 14 and 15 are switched. During this time, information moves from the core 12 to the cores 14 and 15. On the next energization of the winding 110, the cores 13 and 14 are reset with the delayed information being supplied to the output windings $52_1$ and $55_1$ included in each of the two first-stage delaying elements.

Again it is emphasized that for purposes of the instant application, it is necessary to keep in mind only that the cores 11 through 15 along with the windings and apertures included thereon are included simply to provide two delaying arrangements for each stage of counter operation. Thus, information supplied to the sum winding $50_1$ will be transmitted by the first delaying arrangement included in the first stage to the previous state input winding $52_1$ at a later time, as specified above. Similarly, information supplied to the carry winding $53_1$ will be transmitted by the second delaying element of the first stage to the first stage output winding $55_1$, which also functions as the second stage input winding. To similar delaying arrangements are included in the second counter stage.

The convention will now be adopted that a binary "1" signal is induced in a winding coupled to either of the magnetic circuits 60 or 65 when it tends to produce a current in the direction of the corresponding arrow 120, 125, 130, 140, 150, 160, or 170 which is associated therewith. Conversely, a binary "0" signal is said to be induced in a winding if it tends to produce a current in a direction opposite to the appropriate indicating vector.

Before describing a typical sequence of circuit operation of the arrangement shown in FIG. 1, the circuit functioning of the core 10, which generates the logic required for each counter stage, will be discussed along with the convention employed in FIGS. 2 and 3 to illustrate the magnetic condition of the ferromagnetic legs of the core 10. It is noted that the operation of the cores 11 through 15 is fully disclosed in my aforementioned joint application.

Figure 2:
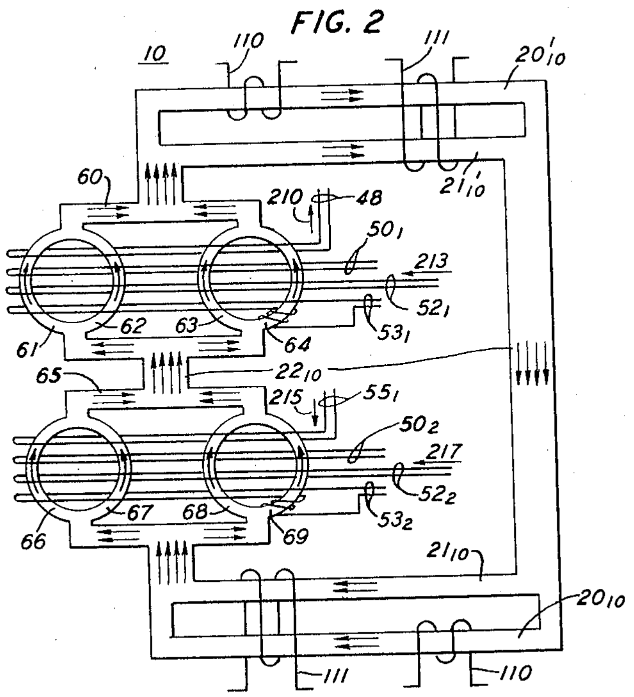
FIG. 2 is a diagram of a first magnetic condition for one of the multiapertured cores illustrated in FIG. 1.
Figure 3:
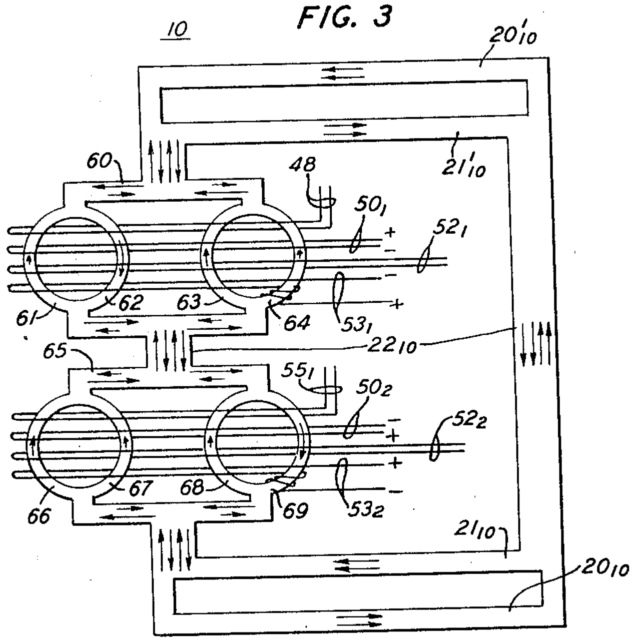
FIG. 3 is a diagram of a second magnetic condition for the multiapertured core illustrated in FIG. 2.

Each vector shown in FIGS. 2 and 3 represents a measure of magentic flux with a larger vector representing proportionally more flux than a shorter vector. Except in the magentic members 61 through 64 and 66 through 69 of FIG. 3 wherein because of space limitations each vector represents the net flux flowing therein, the total additive length of the vectors contained in any particular magnetic member indicates the flux-carrying capacity of the member and hence remains constant. The legs $\mathbf{20}_{10}$, $\mathbf{20'}_{10}$, $\mathbf{21}_{10}$ and $\mathbf{21'}_{10}$ will in every case have flux vectors whose total length is two flux units while each of the cross legs $\mathbf{22}_{10}$ has flux vectors whose total length is four units. Accordingly, the flux-carrying capacity of each member of the magentic circuits 60 and 65 included in the cross leg $\mathbf{22}_{10}$ is one flux unit, as illustrated in FIG. 2. Where all the vectors in any magnetic leg have a like orientation, the fluxes are additive and, with the aforenoted exception, the material is in a maximum remanent condition. When two vectors are of opposite polarities, the longer of the vectors depicts the direction of flux flowing through the corresponding member, and the flux has a magnitude proportional to the vector difference. When the flux vectors have a net zero difference, the associated material is magnetically neutral thereby having no net magnetic flux flowing therethrough.

Assume that the clock source 35 (FIG. 1) has last supplied a pulse to the winding 111 coupled to the driving legs 20 and 20' and shunt legs 21 and 21' included in the core 10. The energized winding 111 saturates the core 10 in a clockwise, reset polarity as shown in FIG. 2. Note in FIG. 2 that the units of flux flowing through all cross sections of any individual one of the members $\mathbf{20}_{10}$, $\mathbf{20'}_{10}$, $\mathbf{21}_{10}$, $\mathbf{21'}_{10}$, and $\mathbf{22}_{10}$ are identical, and that flux is conserved in each junction between any of the members. Hence, the fundamental physical principle that flux be continuous is satisfied.

Assume now that currents represented by the arrows 210 and 213 in FIG. 2 are flowing in the information input and previous state input windings 48 and $52_1$, respectively, away from and towards the magnetic circuit 60 included in the first counter stage. Similarly, assume that currents represented by the arrows 215 and 217 are both flowing towards the magnetic circuit 65 in the respective windings $55_1$ and $52_2$ included in the second counter stage. It is noted that according to the convention adopted hereinbefore, viz., that currents flowing in the direction of the arrows shown in FIG. 1 are binary "1's," the input information and the previous state input signals are respectively "0" and "1," and "1" and "1," in the case of the currents 210 and 213, and 215 and 217, respectively.

When the winding 110 is next supplied with an energization pulse from the clock source 35, it generates a magnetomotive force which reverses the remanent hysteresis magnetization orientation of the driving leg $\mathbf{20}_{10}$ from its previous right-to-left direction illustrated in FIG. 2 to a left-to-right direction illustrated in FIG. 3. Similarly, the driving leg $\mathbf{20'}_{10}$ switches its flux orientation and resides in a right-to-left orientation as shown in FIG. 3. Note that two units of flux now flow from left-to-right in FIG. 3 in the leg $\mathbf{20}_{10}$ and return right-to-left in the shunting leg $\mathbf{21}_{10}$. Also note that two units of flux flow in a closed magnetic path including the driving leg $20'_{10}$ and the shunt leg $21'_{10}$. It should be apparent that the energized switching winding 110 must also supply a switching magnetomotive force to reverse two units of flux in the cross legs $22_{10}$, as no net flux can exist in either of these members under the above-described magnetic states of the driving legs $20_{10}$ and $20'_{10}$ and shunt legs $21_{10}$ and $21'_{10}$. If any flux were contained in either of the legs $22_{10}$ it would have to be returned through either a driving leg or shunt leg, as lines of flux must be continuous as mentioned above. However, each of the driving legs $20_{10}$ and $20'_{10}$ and shunt legs $21_{10}$ and $21'_{10}$ is in a saturated condition and, moreover, the driving legs $20_{10}$ and shunt leg $21_{10}$, and the driving leg $20'_{10}$ and shunt leg $21'_{10}$ already have two continuous units of flux flowing therethrough in two closed, complete, magnetic paths. Hence, each of the cross legs $22_{10}$ is driven by the switching winding energization from a saturated condition to a neutral condition, as illustrated in FIG. 3.

The currents shown in FIG. 2 supplied to the windings 48 and $52_1$ produce magnetizing forces which cancel each other in the magnetic members 61 and 64, while these currents aid and retard the switching force supplied by the energized winding 110 to the magnetic members 62 and 63, respectively. It is a well known physical principle of magnetics that the speed of domain wall motion, and therefore also the speed of square loop magnetic switching, is directly proportional to the applied magnetizing force. Therefore, since a larger force is applied to the member 62 than to the remainder of the magnetic members included in the magnetic circuit 60, this harder driven member 62 switches at a more rapid rate of speed. Since the total flux switched in the magnetic circuit 60 is constrained to be two flux units, a greater portion of these two flux units will switch in the faster-switching member 62 than in the remaining members 61, 63 and 64 combined. (As will be discussed hereinafter, this is actually a more stringent requirement than is necessary for proper circuit operation.) The resulting magnetic condition of the members included in the magnetic circuit 60 is as shown in FIG. 3.

In a mode of operation which parallels that described above, the currents shown in FIG. 2 flowing in the windings $55_1$ and $52_2$ coupled to the magnetic circuit 65 produce magnetomotive forces which aid the energized winding 110 to reverse the flux in magnetic member 69, thereby resulting in more flux being switched in the member 69 than in the remaining magnetic members 66 through 68 combined. The resulting magnetic condition for the circuit 65 is also shown in FIG. 3.

As mentioned above, the first stage sum and carry output winding $50_1$ and $53_1$, and the second stage sum and carry output windings $50_2$ and $53_2$, are coupled to selected ones of the magnetic members included in the corresponding magnetic circuits 60 and 65, respectively, in an opposite polarity. In addition, signals induced by the switching of flux in members which are coupled to a winding in opposite polarities tend to have a cancelling effect on one another. However, in the specific example assumed above a larger flux change occurred in the magnetic member 62 of the circuit 60, and the member 69 in the circuit 65, than occurred in the remaining members of the corresponding magnetic circuits combined. Therefore these faster-switching magnetic members 62 and 69 induce proportionally larger signals in the output windings coupled thereto than do the slower-switching members. Hence by a simple application of Lenz' Law it is apparent that voltages are induced in the windings $50_1$, $53_1$, $50_2$, and $53_2$ in the polarities shown in FIG. 3.

The core 10 is reset to its original magnetization condition illustrated in FIG. 2 by the next succeeding current pulse supplied by the winding 111 coupled to the driving legs $20_{10}$ and $20'_{10}$ and the shunt legs $21_{10}$ and $21'_{10}$ to produce a flux in the clockwise direction throughout the core. This energized winding switches two units of flux in each of the core legs $22_{10}$, $20_{10}$ and $20'_{10}$ thereby resetting the core to its initial magnetization condition.

With this basic functioning of a core in mind, a typical cycle of the binary counter circuit operation for the FIG. 1 arrangement will now be described. Assume first that the clock pulse source 35 supplies an energization pulse to each of the windings 110 through 112, in that order, to set the cores 10 through 15 to the required initial state with no input information being supplied by the source 30. More specifically, the first pulse, supplied to the winding 110, saturates the cores 13 and 14 to the clockwise, reset direction, while placing the cores 10 and 11 in the switched orientation. This action is described hereinabove for the core 10 and in detail in my aforementioned joint application for the core 11. As a result the cross legs $22_{10}$ and $22_{11}$ are in a magnetically neutral state. There will, of course, be no flux perturbations in any of the magnetic members in either of the magnetic circuits 60 or 65, or around any of the apertures 40 through 43 associated with the core 11, as no input information is at this time supplied by the source 30 or exists in the system. When the source 35 next supplies a pulse to the winding 111, cores 10 and 15 are both switched to the clockwise, saturated, reset condition, with a flux flowing upwards in each of the magnetic members 61 through 64 and 66 through 69, as shown in FIG. 2. The cores 13 and 14 are at this time placed in a neutral orientation with their cross legs 22 being demagnetized. Coincident with the first energization of the windings 111 and 112, the initial condition source 37 supplies a pulse to the winding 114 which is coupled to each of the apertures 40 through 43 included in the cores 13 through 15. As described in my cofiled joint application, the magnetizing force supplied by the winding 114 aids the switching field generated by the switching winding 111 on one side of these apertures and retards the switching field on the other side. This has a practical effect of leaving a net counter-clockwise, continuous flux flowing around each of these apertures in what is termed the binary "0" storage direction. Finally, an energization pulse supplied to the winding 112 returns the cores 11 and 12 to a clockwise, saturated, reset condition while placing the cores 14 and 15 in a switched, neutral condition. As the source 37 also energizes the winding 114 at this time, the binary "0" or counter-clockwise flux condition is established around each of the apertures 40 through 43 included in the cores 14 and 15. The proper initial conditions, viz., the cores 10 through 12 in a reset, clockwise, saturated state and the cores 13 through 15 in a switched, neutral condition with their cross legs 22 being demagnetized, and binary "0" flux perturbations flowing around the apertures 40 through 43 of these latter-named cores, are thereby established. It is noted that once these initial conditions have been established, the source 37 and the winding 114 no longer perform any circuit operations.

Assume now that at the time the next pulse is supplied to the winding 110, the input information source 30 supplies a current pulse, representing a first binary "1," to the winding 48 in the direction of the arrow 125. Coincidently therewith, the previous state input winding $52_1$ included in the first delaying element of the first counter stage has induced therein a binary "0" input current, in a direction opposite to the arrow 115. The switching magnetizing force supplied by the winding 110 drives the cross legs $22_{10}$ included in the core 10 from their previously saturated condition to a neutral magnetic condition, and is aided by both the energized windings 48 and $52_1$ in the magnetic member 63. The member 63 thereby undergoes a relatively large change in its flux condition, as illustrated in FIGS. 2 and 3 and indicated in Table I, supra. As a larger flux is switched in the leg 63 included in the first counter stage than in all of the remaining legs in the magnetic circuit 60 combined, a binary "1" signal is induced in the direction of the vector 130 in the sum output winding $50_1$. This signal is supplied to the first, or previous state delaying arrangement included in the first counter stage. In addition, a signal opposite to the direction of the vector 120, indicative of a binary "0," is induced in the carry output winding $53_1$. This signal is supplied to the second, or carry delaying arrangement of the first counter stage.

In a similar manner, the binary "0's" supplied by both the carry delaying circuit output winding $55_1$ from the first stage and the previous state input winding $52_2$ included in the second counter stage are supplied as inputs to the magnetic circuit 65. These signals switch a relatively greater amount of flux in the member 66 than in all of the remaining legs 67, 68 and 69 combined, thereby inducing binary "0" currents, opposite to the vectors 150 and 170, in each of the sum and carry output windings $50_2$ and $53_2$ included in the second binary counter stage. When the windings 111 and 112 are sequentially supplied with pulses by the clock source 35, the above-described signals are propagated along each of the four delaying networks, and the delaying networks are in a condition to transmit these signals to the appropriate magnetic circuit input windings when the winding 110 is once again energized.

When the input information source 30 next supplies a second binary "1" signal, and the clock pulse source 35 coincidently energizes the winding 110, the previous state output from the first delaying element included in the first counter stage now supplies the binary "1" current to the winding $52_1$, in the direction of the arrow 115. This binary "1" signal was supplied to the first delaying network during the previous energization of the winding 110. The binary "1" currents flowing in the input windings 48 and $52_1$ generate aiding magnetizing forces which switch a relatively large amount of flux in the magnetic member 64. As more flux is switched in the member 64 than in the remaining members of the magnetic circuit 60, a binary "0" current is at this time induced in the sum output winding $50_1$ in a direction opposite to the vector 130, as described in Table I and illustrated in FIGS. 2 and 3. In addition, the flux switched in the magnetic member 64 induces a net binary "1" current in the direction of the vector 120 in the carry output winding $53_1$. Hence, referring back to the truth table shown in Table I, the correct signals, viz., a sum binary "0" and a carry binary "1," are generated in response to the input and previous state signals both being binary "1's." During this period, the second counter stage is again supplied with two input binary "0's" and functions in a manner identical to that described hereinbefore, viz., binary "0's" are once again supplied to both the second stage sum and carry output windings $50_2$ and $53_3$. Hence, the FIG. 1 arrangement has been shown to function in direct conformity with the Table I truth table, as every combination of input variables has been supplied to one of the two counter stages and the proper output signals have been derived therefrom.

It should be observed that in response to each input binary "1" supplied by the input source 30, the counter changes the information stored in at least one of the delaying networks included therein, and a binary "1" carry signal is supplied to each successive stage in response to every two input binary "1's" supplied to the preceding stage. In the two-stage FIG. 1 counting arrangement, after every four input "1's" have been supplied by the source 30, and in response to the next complete cycle of the clock pulse source 35 thereafter, regardless of the identity of the input binary character supplied during that cycle, a binary "1" signal will be supplied by the output winding $55_2$, included in the second counter stage, to the output means 39. At this time, the circuit may be reset to its initial condition, with binary "0" information residing in each of the four delaying elements, by supplying input binary "0's" thereto during both the aforementioned clock cycle and also the next succeeding clock cycle, so that the circuit will again be ready to accept an input information word and count the number of binary "1's" included therein.

It should be apparent at this point that any flux flowing in the cross legs 22 of the cores 10 through 15 should advantageously have a propensity for dividing equally in the ferromagnetic material on each side of each of the apertures 40 through 43, and through each member of the magnetic circuits 60 and 65 in the absence of any energized input signal conductors. To enhance this flux division, the outer extremities of the rectangular core apertures formed by the driving legs 20 and 20' with the shunt legs 21 and 21', respectively, are made colinear with the center of the magnetic circuits 60 and 65 or the centers of the apertures 40 through 43. This symmetry aids the balancing of flux in the cross legs 22.

Also, only one of the driving legs 20 and 20' and an associated one of the shunt legs 21 and 21' is, in fact, essential for circuit operation, and the redundant members may simply be replaced by a magnetic member having no windings linked thereto and characterized by a like flux capacity as each of the cross legs 22. However, the two driving legs 20 and 20' and the two shunt legs 21 and 21' are employed in the illustrative embodiment shown in FIG. 1 simply to make the cores symmetrical and thereby further enhance the balancing of flux through the cross legs 22 associated therewith.

In addition, it is by no means essential to the operation of the present invention that equal flux capacities and therefore equal units of flux be employed in the driving legs and shunt legs. For example, if the flux capacities of the cross, driving and shunt legs were $m$, $k$ and $m-k$ units, respectively, where $m$ is greater than $k$, and the driving legs were initially set with $k$ units of flux, and the cross legs biased with $m$ units of flux, then the shunt legs would contain $m-k$ quiescent flux units. Then, when the switching winding reverses the orientation of the $k$ flux units contained in the driving legs, the orientation of $k$ units of flux in the cross legs would also have to reverse. In the special case where $m$ equals $k$, the shunt legs may be deleted. As in the mode of operation described hereinabove, signals would be induced in the coupling windings associated with apertures coupled to an energized input winding in a polarity dependent upon the direction of residual flux being switched around the corresponding aperture.

By employing driving legs with a small flux capacity, the net amount of flux reversed in the entire core decreases when the driving legs are driven between remanent conditions by the switching and reset windings. If smaller magnitudes of flux are switched, the core dissipates less heat, as core heating is directly proportional to the flux switched therein. As is well known, a decrease in the heating of a magnetic core allows the core to be operated at a higher repetition rate, which is a desirable advantage. Under these conditions, however, the magnitude of the output signals would also decrease proportionally.

Also, while the foregoing discussion assumed that the input signals supplied to the magnetic circuits 60 or 65 were of sufficient magnitude to switch more flux in one selected member than the sum of the flux switched in the remaining three members, all that is required for proper circuit functioning is that the sum of the flux switched in the fastest and slowest switching members exceed the flux switched in the remaining two members.

Summarizing, an illustrative magnetic core binary counter made in accordance with the principles of the present invention employs six ferromagnetic multiapertured cores. Each core includes two driving legs, each shunted by a magnetic member of a like cross-sectional area. Two cross legs are provided to complete a magnetic path which also includes the driving legs. Each cross leg member has a uniform cross-sectional area which is twice the magnitude of that possessed by each of the driving and shunt legs and, corresponding to an $n$-stage binary counter, $n$ magnetic circuits each including four equal-length parallel magnetic paths are included in the cross legs of the first one of the cores. The cross legs contained in each of the remaining cores includes $2n$ apertures centrally located along the long axes thereof.

Each counter stage comprises one of the magnetic circuits included in the first core which has coupled thereto two input windings and two output windings which are employed to respectively generate Exclusive OR or sum logic, and the AND or carry binary logic function. In addition, two delay elements are provided, each including three short-circuited windings coupled to apertures included in the remaining five cores. One delay element is employed to supply the sum signal back to one input winding linked to the magnetic circuit, and the remaining delay element transmits the carry signal to an input winding included in the next succeeding counter stage. Binary input information is supplied to an input winding coupled to the first counter stage, and is manifested by the presence of an input current flowing in one of the two possible directions.

Logic is generated, and counting information is advanced in the counter in response to pulses supplied by a three-phase clock source which selectively switches and resets each of the six multiapertured cores between a saturated and a neutral magnetic condition.

It is to be understood that the above-described arrangement is only illustrative of the application of the principles of the present invention. Numerous other arrangements may be devised by those skilled in the art without departing from the spirit and scope of this invention. For example, two counting stages were chosen for purposes of illustration, but any number of stages might well have been included. In general, corresponding to an $n$-stage binary counter, $n$ magnetic circuits each including four shunt-connected parallel paths are included in the cross legs 22 of the core 10, while $2n$ apertures are included in the cross legs 22 of each of the cores 11 through 15. Note, however, that independent of the number of stages employed, the number of cores remains fixed.

Further, accompanied by winding modifications obvious to those skilled in the art the two different binary characters supplied by the input source 30 may advantageously be manifested by the presence or absence of current, as well as by a current flowing in one of the two possible directions, as employed in the description hereinabove.

What is claimed is:

1. In combination in a multistage counter circuit, first through sixth inclusive ferromagnetic, multiapertured cores, each of said cores including a cross leg, a shunt leg, and a driving leg which completes a closed magnetic path through said cross leg, said shunt leg being connected in parallel with said driving leg, said cross legs included in said second through sixth cores including a plurality of apertures located on the long axes thereof, said cross leg included in said first core including a plurality of magnetic circuits each comprising four shunt-connected, ferromagnetic members, each of said counter stages comprising one of said magnetic circuits included in said first magnetic core and a first and second delaying network, each of said delaying networks comprising an aperture included in each of said second through sixth cores and a plurality of shortcircuited coupling windings, including an input and an output winding, each linked to a plurality of said core apertures, said input and output windings included in said first delaying network and said input winding included in said second delaying network being coupled to each magnetic member of said magnetic circuit, said output winding included in said second delaying network being connected to each magnetic member included in the magnetic circuit of the next succeeding counter stage.

2. A combination as in claim 1 further including a clock pulse source including a first, second and third output terminal, said clock pulse source alternately energizing said first, second and third output terminals, a first clock winding coupled to said driving leg of said first and second cores in a first polarity and coupled to said driving and shunt legs of said fourth and fifth cores in a second polarity, a second clock winding coupled to said driving leg included in said third and fourth cores in said first polarity and coupled to said driving and shunt legs of said first and sixth cores in said second polarity, and a third clock winding coupled to said driving leg included in said fifth and sixth cores in said first polarity and coupled to said driving and shunt legs included in said second and third cores in said second polarity, said first, second and third clock windings being respectively connected to said first, second and third clock source output terminals.

3. A combination as in claim 2 further including an information source and an input winding coupled to each member of the magnetic circuit including in said first core and associated with said first binary counter stage, said input winding being connected to said information source.

4. A combination as in claim 3 further including output means connected to said output winding included in said second delaying network included in the last binary counter stage.

5. In combination, a plurality of magnetic circuits, a first one of said circuits comprising four magnetic members connected in parallel and a flux source connected in series therewith, the remainder of said magnetic circuits including a first and second magnetic member connected in parallel and a flux source connected in series therewith, and a short-circuited winding coupled to said four magnetic members included in said first magnetic circuit and to said first and second magnetic members included in each of said remaining magnetic circuits.

6. A combination as in claim 5 wherein said short-circuited winding is coupled to three of said magnetic members included in said first magnetic circuit in a first polarity and coupled to the remaining member included in said first magnetic circuit in a second polarity, said short-circuited winding being further coupled in opposite polarities to said first and second magnetic members included in the remainder of said magnetic circuits.

7. A combination as in claim 5 wherein said short-circuited winding is linked to two members of said first magnetic circuit in one polarity and the other two members of said first magnetic circuit in an opposite polarity, said winding being coupled to said first and second magnetic members included in each of said remaining magnetic circuits in opposite polarities.

8. A combination as in claim 7 further including a flux source controlling means for enabling selected ones of said flux sources included in said magnetic circuits to supply a first magnitude of flux and for enabling the remainder of said flux sources to supply a second magnitude of flux to said associated parallel-connected magnetic elements.

9. A combination as in claim 8 further including a plurality of second magnetic circuits, the first group of said second magnetic circuits comprising four parallel-connected magnetic members and the remainder of said second magnetic circuits including two parallel-connected magnetic members, each of said first group of said second plurality of magnetic circuits being serially connected with said first, four-membered magnetic circuit and each of the two-membered magnetic circuits included in said second magnetic circuit plurality being serially connected with one of said first plurality of two-membered circuits.

10. A combination as in claim 9 further including a plurality of short-circuited windings, each of said windings being coupled to each member of one of said four-membered circuits and to the members of each of a plurality of said two-mentioned circuits in opposite polarities.

11. In combination in a binary counter logic element, a magnetic circuit including four magnetic members connected in parallel, a flux source connected in series therewith, a sum output winding coupled to two of said magnetic members in a first polarity and coupled to the remaining two magnetic members in a second polarity, and a carry output winding coupled to three of said magnetic members in said first polarity and coupled to said remaining magnetic member in said second polarity.

12. A combination as in claim 11 further including first and second input windings, each of said input windings being coupled to two magnetic members in said first polarity and coupled to two other magnetic members in said second polarity, said first and second input windings both being coupled to a specific one of said members in said first polarity, coupled to another of said magnetic members in said second polarity and coupled to the remaining two magnetic members in opposite polarities.

13. In combination in an $n$-stage magnetic core binary counter, where $n$ is any positive integer, first through sixth, inclusive, square loop, ferromagnetic, multi-apertured cores, each of said cores including a driving leg, a shunt leg and a cross leg, said driving leg being connected to said cross leg thereby completing a closed magnetic path which also includes said cross leg, said shunt leg being connected in parallel with said driving leg, $n$ magnetic circuits each including four parallel-connected magnetic members included in said cross leg included in said first magnetic core, and $2n$ apertures included in said cross leg included in each of said second through sixth magnetic cores, each of said counter stages comprising one of said $n$ magnetic circuits and a first and second delaying network, each of said delaying networks comprising an aperture included in each of said second through sixth cores, and a plurality of short-circuited coupling windings, including an input and an output winding, each linked to a plurality of said core apertures, said input and output windings included in said first delaying network and said input winding included in said second delaying network being coupled to each magnetic member of said magnetic circuit, said output winding included in said second delaying network being connected to each magnetic member included in said magnetic circuit of the next succeeding counter stage.

14. A combination as in claim 13 further including a clock pulse source having first, second and third output terminals, said clock pulse source sequentially energizing said first, second and third output terminals, a first clock winding coupled to said driving leg of said first and second cores in a first polarity and coupled to said driving and shunt legs of said fourth and fifth cores in a second polarity, a second clock winding coupled to said driving legs included in said third and fourth cores in said first polarity and coupled to said driving and shunt legs of said first and sixth cores in said second polarity, and a third clock winding coupled to said driving legs included in said fifth and sixth cores in said first polarity and coupled to sad driving and shunt legs included in said second and third cores in said second polarity, said first, second and third clock windings being respectively connected to said first, second and third clock source output terminals.

References Cited by the Examiner

UNITED STATES PATENTS

| | | | |
|---|---|---|---|
| 2,978,176 | 4/1961 | Lockhart | 340—174 |
| 3,014,988 | 12/1961 | McCreary | 340—174 |
| 3,155,960 | 11/1964 | Bockemuehl | 340—174 |

BERNARD KONICK, *Primary Examiner.*

M. GITTES, *Assistant Examiner.*